United States Patent
Peterson

(10) Patent No.: US 12,359,545 B2
(45) Date of Patent: Jul. 15, 2025

(54) WELL PUMP CONTROL SYSTEM AND METHOD

(71) Applicant: Ronald G. Peterson, Racine, WI (US)

(72) Inventor: Ronald G. Peterson, Racine, WI (US)

(73) Assignee: Unico, LLC, Franksville, WI (US)

( * ) Notice: Subject to any disclaimer, the term of this patent is extended or adjusted under 35 U.S.C. 154(b) by 863 days.

(21) Appl. No.: 17/490,717

(22) Filed: Sep. 30, 2021

(65) Prior Publication Data
US 2023/0098068 A1   Mar. 30, 2023

(51) Int. Cl.
| | | |
|---|---|---|
| E21B 43/12 | (2006.01) | |
| E21B 47/009 | (2012.01) | |
| E21B 47/047 | (2012.01) | |
| F04B 49/20 | (2006.01) | |
| G05D 9/12 | (2006.01) | |

(52) U.S. Cl.
CPC .......... *E21B 43/127* (2013.01); *E21B 47/009* (2020.05); *E21B 47/047* (2020.05); *F04B 49/20* (2013.01); *G05D 9/12* (2013.01); *G05B 2219/43193* (2013.01)

(58) Field of Classification Search
USPC ....................................................... 700/282
See application file for complete search history.

(56) References Cited

U.S. PATENT DOCUMENTS

| | | | | |
|---|---|---|---|---|
| 4,854,164 A | * | 8/1989 | Rhoads | E21B 47/113 73/863.03 |
| 7,168,924 B2 | | 1/2007 | Beck et al. | |
| 7,668,694 B2 | | 2/2010 | Anderson et al. | |
| 8,249,826 B1 | | 8/2012 | Anderson et al. | |
| 8,444,393 B2 | | 5/2013 | Beck et al. | |
| 2004/0064292 A1 | * | 4/2004 | Beck | F04B 47/02 702/182 |
| 2005/0274515 A1 | * | 12/2005 | Smith | E21B 43/385 166/265 |
| 2011/0103974 A1 | * | 5/2011 | Lamascus | F04B 49/20 417/45 |

(Continued)

FOREIGN PATENT DOCUMENTS

EP      2156007 B1 * 6/2019 ........... E21B 47/042

OTHER PUBLICATIONS

CA_2841412_A1 (Year: 2013).*

*Primary Examiner* — Hien D Khuu
(74) *Attorney, Agent, or Firm* — Reinhart Boerner Van Deuren P.C.

(57) ABSTRACT

A method for controlling a well pumping system is provided. The method includes the steps of entering a pump intake depth, a minimum fill preset, a maximum fill preset, and a gain value into a controller for the well pumping system, and determining a fluid over pump level. If the fluid over pump level is zero, the method calls for setting a target pump fill equal to the maximum fill preset. If the fluid over pump level is not zero, the method calls for calculating a fluid over pump ratio using the pump intake depth, and calculating the target pump fill using the fluid over pump ratio and the gain value. Further, the method includes calculating a pump fill error as the difference between the target pump fill and an actual pump fill. The method further includes controlling a pumping speed of the well pumping system based on the pump fill error.

6 Claims, 8 Drawing Sheets

(56) References Cited

U.S. PATENT DOCUMENTS

| | | | |
|---|---|---|---|
| 2014/0129037 A1* | 5/2014 | Peterson | E21B 47/009 700/282 |
| 2015/0260027 A1* | 9/2015 | Wang | E21B 43/2408 700/282 |
| 2016/0265321 A1* | 9/2016 | Elmer | F04B 47/022 |
| 2017/0037845 A1* | 2/2017 | Al Assad | F04B 49/065 |
| 2017/0234310 A1* | 8/2017 | Mancuso | F04B 49/20 417/1 |
| 2017/0268500 A1* | 9/2017 | Al Assad | F04B 49/065 |
| 2018/0038366 A1* | 2/2018 | Sobin | F04B 53/14 |
| 2019/0085840 A1* | 3/2019 | Leonard | F04B 49/20 |

* cited by examiner

WELL PUMP CONTROL SYSTEM AND METHOD

FIELD OF THE INVENTION

This invention generally relates to well pumping systems and methods for the control of same.

BACKGROUND OF THE INVENTION

Gas slugging presents a significant challenge to operators of sucker-rod pumping devices used in horizontal wells. Gas slugging in horizontal wells commonly results in gas in the pump, reducing pump efficiency and causing the controls to decrease pumping speed, both of which can result in lost production potential. Unlike in a typical vertical well, in horizontal wells, the pump is typically positioned above the casing perforations, making downhole gas separation difficult or impossible.

Thus, in horizontal wells, gas invariably enters the pump intake, often in large, periodic slugs. This presents a problem to both the pump itself (i.e., loss of efficiency) and to the controls (e.g., how to respond to this condition in order to maximize production). In many cases, the result is damaged or worn out equipment, or lost oil and/or gas production due to inefficient pumping controls. This problem has become more prevalent as horizontal wells gain popularity.

Minimizing gas in the pump and maximizing volumetric pump efficiency through careful down-hole component selection and design is typically the responsibility of the well completion design engineer. Historically sucker rod pump controllers regulate pumping speed or shut-off time by controlling the speed of the pump motor. The controllers typically regulate pumping speed based on pump fill—the volumetric percentage of liquid in one stroke of the pump as compared to gross pump displacement. Stated another way, pump fill is the volume of liquid plus gas within the pump, at the pump discharge pressure, expressed as a percentage of the total pump displacement, measured during the downstroke. The pump fill is one factor representing net total fluid pumping capacity. Sometimes, it is referred to as Total Pump Fill.

If pump fill is incomplete (i.e., gas enters the pump, causing pump fill to decrease), the controller will reduce pumping speed or shut off. This technique works well to regulate well fluid level at the pump intake on vertical wells with good gas separation. On gassy, horizontal wells (or any well with poor downhole gas separation), however, low pump fill is common despite high bottom-hole pressure (i.e., high flow potential)—hence lost production potential if the controller reduces speed excessively.

Embodiments of the invention described herein provide a system and method for improving the performance of well pumping systems. These and other advantages of the invention, as well as additional inventive features, will be apparent from the description of the invention provided herein.

BRIEF SUMMARY OF THE INVENTION

In one aspect, embodiments the invention provide a method for controlling a well pumping system. The method includes the steps of entering a pump intake depth, a minimum fill preset, a maximum fill preset, and a gain value into a controller for the well pumping system, and determining a fluid over pump level. If the fluid over pump level is zero, the method calls for setting a target pump fill equal to the maximum fill preset. If the fluid over pump level is not zero, the method calls for calculating a fluid over pump ratio using the pump intake depth, and calculating the target pump fill using the fluid over pump ratio and the gain value. Further, the method includes calculating a pump fill error as the difference between the target pump fill and an actual pump fill. The method further includes controlling a pumping speed of the well pumping system based on the pump fill error.

In a particular embodiment of the method, calculating the pump fill error comprises setting the pump fill error equal to the actual pump fill minus the target pump fill. In certain embodiments, controlling a pumping speed of the well pumping system based on the pump fill error calls for increasing the pumping speed if the pump fill error is greater than zero, decreasing the pumping speed if the pump fill error is less than zero, and maintaining the pumping speed if the pump fill error is equal to zero.

In some embodiments of the method, the fluid over pump ratio is calculated using the following formula:

$$FOP \text{ Ratio} \% = 100 \times \frac{FOP}{\text{Pump Intake Depth}}.$$

In other embodiments of the method, the target pump fill is calculated using the following formula:

$$\text{Target Pump Fill} = \text{Max Fill Preset} - \frac{FOP \text{ Ratio } \% \times \text{Max Fill Preset} \times \text{Gain}}{100}.$$

In a further embodiment, calculating the target pump fill using the fluid over pump ratio and the gain value comprises limiting the target pump fill to a value no greater than the maximum fill preset and no lower than the minimum fill preset.

In another aspect, embodiments of the invention provide a rod pumping system for pumping liquid from a well. The rod pumping system includes a pump configured for disposal in the well, and a rod string attached to the pump at a first end. The rod string is attached, at a second end opposite the first end, to a mechanism configured to impart a reciprocating motion to the rod string. A motor is attached to the mechanism and configured to move the mechanism in a reciprocating manner causing the mechanism to impart the reciprocating motion to the rod string. A controller is configured to automatically calculate a target pump fill, and further configured to automatically control a pumping speed of the rod pumping system based on the calculated target pump fill.

In a particular embodiment, the controller is configured to calculate an FOP Ratio using the following formula:

$$FOP \text{ Ratio} \% = 100 \times \frac{FOP}{\text{Pump Intake Depth}}.$$

In a further embodiment, the controller is configured to calculate the target pump fill using the following formula:

$$\text{Target Pump Fill} = \text{Max Fill Preset} - \frac{\text{FOP Ratio \% } x \text{ Max Fill Preset } x \text{ Gain}}{100}.$$

The controller may be further configured to limit the target pump fill to a value no greater than a maximum fill preset and no lower than a minimum fill preset. In certain embodiments, the controller is configured to calculate a pump fill error by setting the pump fill error equal to the actual pump fill minus the target pump fill.

In at least one embodiment, the controller is configured to control the pumping speed by increasing the pumping speed if the pump fill error is greater than zero, decreasing the pumping speed if the pump fill error is less than zero, and by maintaining the pumping speed if the pump fill error is equal to zero.

In some embodiments, the mechanism is a walking beam. In a further embodiment, the rod pumping system includes a current sensor and a voltage sensor, each connected to the motor to sense a level of current and voltage, respectively supplied to the motor. The controller may be configured to monitor the level of current and voltage to determine a load or torque on the motor, the controller being further configured to determine an FOP level based on the torque on the motor.

In certain embodiments, the controller is configured to automatically control the pumping speed by controlling a motor speed. In other embodiments, the controller is configured to automatically control the pumping speed based on the target pump fill and an actual pump fill Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims, including, but not limited to, substituting pump intake pressure for fluid level over the pump.

DETAILED DESCRIPTION OF THE INVENTION

In conventional sucker rod well pump control systems, for example, those used on a conventional vertical well, the controller may include logic that compares a target pump fill set point to actual pump fill, and then takes action upon that error. The Target Pump Fill is the volume of liquid plus gas within the pump, at pump discharge pressure, expressed as a percentage of the total pump displacement, and measured during the downstroke. The Target Pump Fill is one factor representing the net total fluid pumping capacity, sometimes referred to as Total Pump Fill.

A rod pump control system is disclosed in U.S. Pat. Nos. 7,168,924 and 8,444,393, both entitled "Rod Pump Control System Including Parameter Estimator." U.S. Pat. No. 8,249,826, entitled "Determination and Control of Wellbore Fluid Level, Output Flow, and Desired Pump Operating Speed, Using a Control System for a Centrifugal Pump Disposed Within the Wellbore," discloses a system and method for the control of a well pumping system. The entire teachings and disclosures of the aforementioned patents are incorporated herein by reference thereto.

Figure 1:
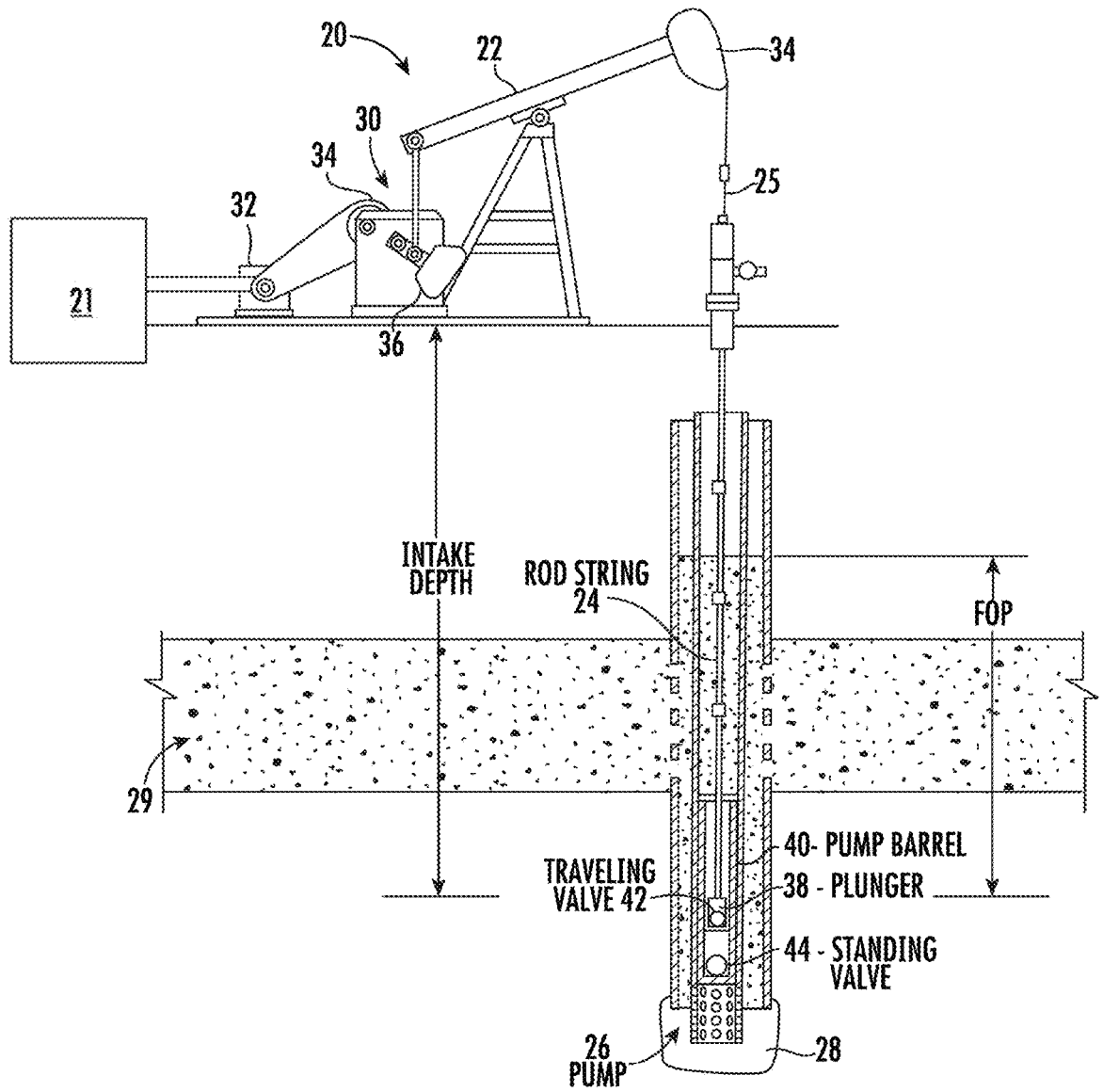
FIG. 1 is a simplified representation showing a sectional view of a prior art rod pumping system for a vertical well.

FIG. 1 is a simplified representation of a prior art rod pump system 20, the operation of which is controlled by a rod pump control system 21 (also referred to herein as the "controller"), and is described with reference to an application in a rod pump system 20 that includes a conventional beam pump. The conventional beam pump has a walking beam 22 that reciprocates a rod string 24 that includes a polished rod portion 25. The rod string 24 is suspended from the beam for actuating a downhole pump 26 that is disposed at the bottom of a well 28 typically below a horizontally-extending oil zone 29 which contains the oil and gas to be brought to the surface.

However, the rod pump control system 21 and method are generally applicable to any system that uses an electric motor to reciprocate a rod string, including those that drive the rod through belt or chain drives. For example, a belt driven pumping unit includes a belt that is coupled to a rod string for reciprocating the rod string vertically within a well as the belt is driven by a motor.

The pump 26 is placed below the surface at an intake depth, shown in FIG. 1, which is the distance the distance from the surface to the pump 26. In the system shown in FIG. 1, the walking beam 22 is actuated by the pitman arm 31, which is reciprocated by a crank arm 30 driven by an electric motor 32 that is coupled to the crank arm 30 through a gear reduction mechanism, such as gearbox 34. The typical motor 32 may be a three-phase AC induction motor whose operating parameters are determined by the capacity and depth of the pump. Other types of motors such as synchronous motors can be used to drive the pumping unit.

The gearbox 34 converts motor torque to a low speed but high torque output for driving the crank arm 30. The crank arm 30 may be provided with a counterweight 36 that serves to balance the rod string 24 suspended from the beam 22 in the manner known in the art. Counterbalance can also be provided by an air cylinder such as those found on air-balanced units. Belted pumping units may use a counterweight that run in the opposite direction of the rod stroke or an air cylinder for counterbalance.

The downhole pump 26 is a reciprocating type pump having a plunger 38 attached to the end of the rod string 24 and a pump barrel 40 which is attached to the end of tubing in the well 28. The plunger 38 includes a traveling valve 42 and a standing valve 44 positioned at the bottom of the barrel 40. On the up stroke of the pump 26, the traveling valve 42 closes and lifts fluid, such as oil and/or water, above the plunger 38 to the top of the well 28 and the standing valve 44 opens and allows additional fluid from the reservoir to flow into the pump barrel 40. On the down stroke, the traveling valve 42 opens and the standing valve 44 closes in preparation of the next cycle. The operation of the pump 26 is controlled so that the fluid level maintained in the pump barrel 40 is sufficient to maintain the lower end of the rod string 24 in the fluid over its entire stroke. FIG. 1 also indicates the fluid over pump (FOP) level as the height of the column of fluid, such as oil or water, above the downhole pump 26.

Figure 2:
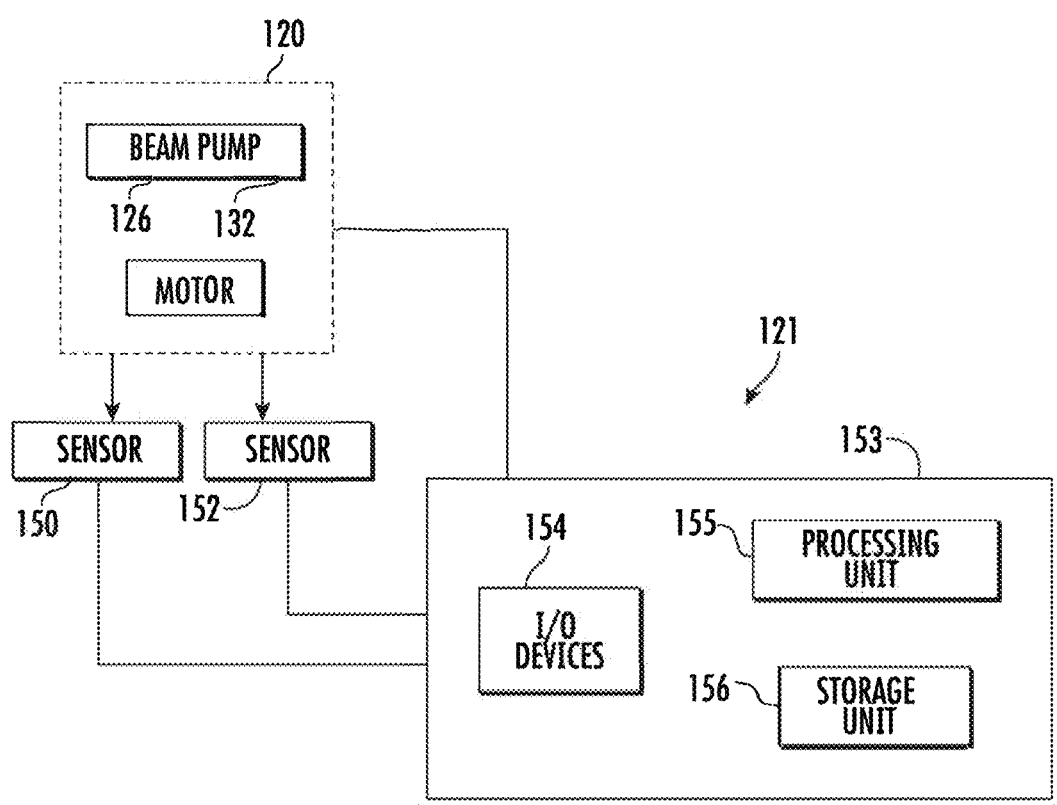
FIG. 2 is a schematic block diagram of a control system for a rod pump system, in accordance with an embodiment of the invention.

Referring to FIG. 2, there is shown a schematic block diagram for an exemplary rod pump control system or controller 21, constructed in accordance with an embodiment of the invention. In embodiments of the invention as in certain prior art rod pump control systems, instantaneous motor currents and voltages together with pump parameters are used in determining rod position and load without the need for strain gauges, load cells, or position sensors as well as determining pump pressure and pump flow without the need for additional downhole or surface sensors. The rod position and load can be used to control the operation of the pump 26 to optimize the operation of the rod pump system 20.

In embodiments of the invention and in some conventional systems, the pump control system 121 includes transducers, such as current and voltage sensors, to sense dynamic variables associated with motor torque and velocity. As shown in FIG. 2, current sensors 150 are coupled to a sufficient number of the motor leads for the type of motor used. The current sensors 150 provide voltages proportional to the instantaneous stator currents in the motor 132. Voltage sensors 152 may be connected across to a sufficient number of the motor windings for the type of motor used and provide voltages proportional to the instantaneous voltages across the motor windings.

The current and voltage signals produced by sensors 150 and 152 can be supplied to a processor 153 through suitable input/output devices 154. The processor 153 may also include a processing unit 155 and electronic memory in storage device 156, which stores programs, data inputs from the user/operator, and data files used in calculating operating parameters and producing control signals for controlling the operation of the sucker well rod pumping system 120 (shown in FIG. 3). This control arrangement provides nearly instantaneous readings of motor velocity and torque, which can be used for both monitoring and real-time, closed-loop control of the rod pump.

Motor currents and voltages are sensed to determine the instantaneous electric power level drawn from the power source by the electric motor operating the well pump. As the rod string 24 that drives the downhole pump 126 is raised and lowered during each cycle, the motor 132 is cyclically loaded. Depending on the particular pump installation configuration, the walking beam 22 is at a known position during maximum and minimum motor loads. The timing of these maximums and minimums can define the operational pumping frequency and, by integration of the motor velocity in light of the motor 132 to crank gearing, it is possible to estimate the phase position of the pump crank at any time. By monitoring the variances of the motor currents and voltages as a function of pump crank angle, the voltage and current variances can be used together with parameters related to pump geometry to calculate estimates of rod position and rod load.

The controller 121 of FIG. 2 differs from prior art rod pump control systems in that the controller 121 is configured to implement the control algorithm disclosed herein below to increase the production rate and pumping efficiency of the rod pump system 20 shown in FIG. 1. As will be described in more detail below, the controller 121 of the present invention is configured to automatically adjust the target pump fill and the pumping speed of the sucker well rod pumping system 120 based on various parameters input to, and sensed by, the controller 121.

Figure 3:
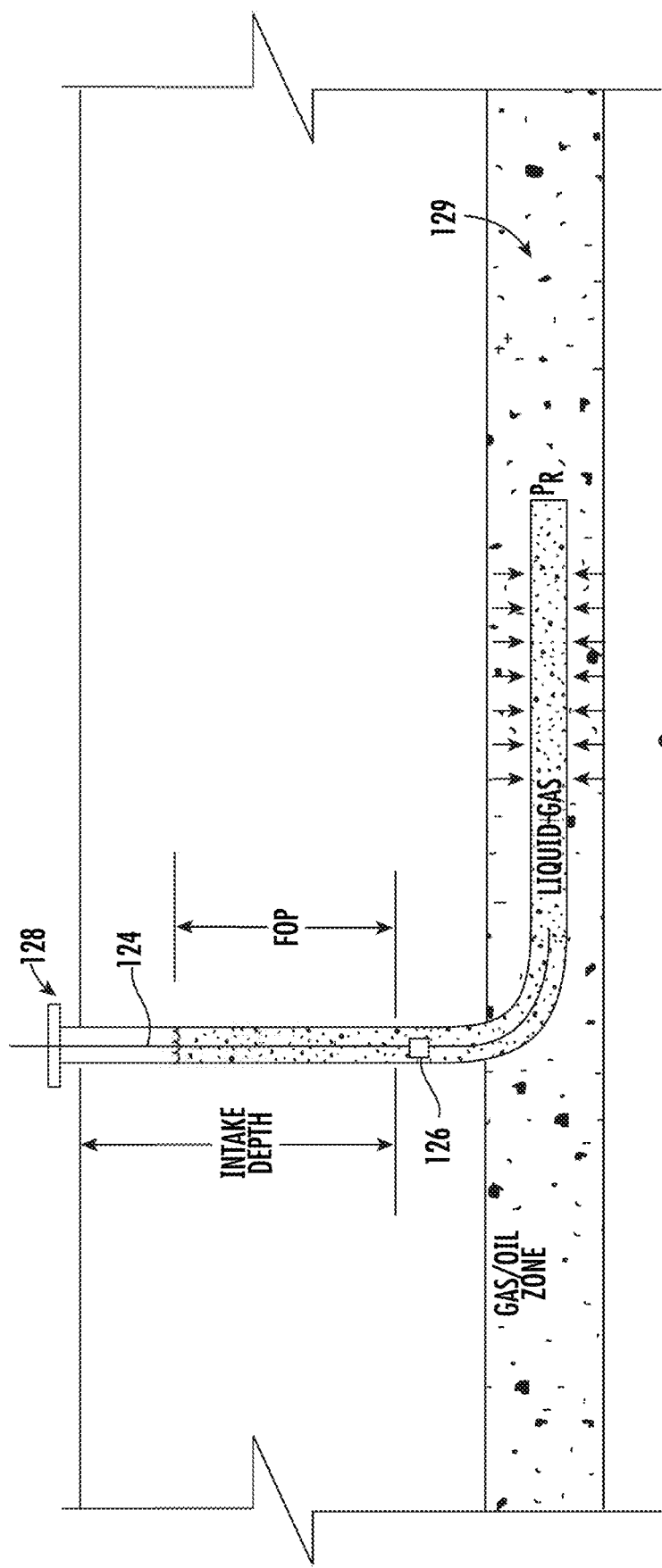
FIG. 3 is a simplified representation showing a sectional view of a horizontal well employing a rod pump control system constructed in accordance with an embodiment of the invention.

FIG. 3 is a simplified representation of a sucker well rod pumping system 120 used in this instance for the pumping of a horizontal well 128, the operation of which is controlled by a controller 121, according to an embodiment of the invention. As explained above, in horizontal wells, gas invariably enters the pump intake, often in large, periodic slugs, which causes problems with respect to both the productivity and longevity of the pump due to efficiency loss and potential damage to the pump components.

As can be seen in the horizontal well 128 of FIG. 3, the pump 126 is positioned above the casing perforations 126, such that any downhole gas mixed in with the oil or fluid does not separate from the oil or fluid before reaching the pump 126. Because the pump 126 in a horizontal well 128 can be expected to encounter more gas along with the liquid being pumped, as compared to the pump in a vertical well, a different control algorithm is needed to optimize efficiency and maximize the rate at which the liquid/gas mixture is moved to the surface.

As in the system of FIG. 1, particular embodiments of the system of FIG. 3 include a downhole pump 126, which may be a reciprocating type pump having a plunger 38 (as shown in FIG. 1) attached to the end of the rod string 124 and a pump barrel 40 (see FIG. 1) which is attached to the end of tubing in the well 128. In a particular embodiment, the plunger 38 includes a traveling valve 42 (see FIG. 1) and a standing valve 44 (see FIG. 1) positioned at the bottom of the barrel 40.

On the up stroke of the pump 126, the traveling valve 42 closes and lifts fluid, such as oil and/or water, above the plunger 38 to the top of the well 128 and the standing valve 44 opens and allows additional fluid from the reservoir to flow into the pump barrel 40. On the down stroke, the traveling valve 42 opens and the standing valve 44 closes in preparation of the next cycle. The operation of the pump 126 is controlled by the controller 121 so that the fluid level maintained in the pump barrel 40 is sufficient to maintain the lower end of the rod string 124 in the fluid over its entire stroke. As in FIG. 1, FIG. 3 also indicates the fluid over pump (FOP) level as the height of the column of fluid, such as oil or water, above the downhole pump 126, and the pump intake depth as the vertical distance between the surface and the pump 126.

In certain rod pump control systems, the target pump fill set point is useful in determining how the system is controlled. The target pump fill set point indirectly represents the desired ratio of liquid to gas. On a gassy well, that ratio is a function of bottom-hole pressure (i.e., a generalized reference to downhole well pressure, typically at or near the pump intake), gas separator efficiency, and fluid properties. A target pump fill set point value that is too high could represent lost production potential, because it corresponds to a higher bottom-hole pressure (i.e., reduced inflow). Conversely, a target pump fill set point value that is too low could result in needless over-speeding of the pump (e.g., if the bottom-hole pressure is low), which can result in reduced efficiency and accelerated downhole equipment wear.

In these cases, the onus usually falls upon the operator to carefully select the target fill set point. If this does not occur, which may be the case if the operator is occupied with other concerns, production may be low and pump operation inefficient. The operator may not have the time or expertise to continually adjust the target fill set point to maintain optimal production.

The down-hole well inflow rate (i.e., the volumetric flow rate of liquid entering the well) is represented by the inflow performance relationship (IPR) curve. The IPR curve provides a graphical representation of the well flowing pressure (i.e., the pressure of the well at the location where fluid is entering the well) versus the well liquid inflow rate. As well flowing pressure drops, well inflow rate increases. If pressure drops below the fluid bubble point pressure, gas will break out of solution and may enter the pump intake. System operators normally strive to minimize the volume of gas that enters the pump intake, as gas in the pump detrimentally affects pump volumetric output—lost production potential. Gas is ideally routed up the casing annulus and away from the pump intake.

As stated above, embodiments of the new system and control process disclosed herein automatically selects a target pump fill based upon average estimated fluid over pump (FOP) level and the actual pump fill. The fluid over pump (FOP) Level is defined as the gas-free liquid equivalent height of the fluid in the well as measured above the pump.

Generally, if the fluid level over pump is low, target pump fill will be increased. If the fluid level over pump is high, target pump fill will be decreased (but not to the point where severe gas interference or gas-locking can occur). In this way, the control maximizes production potential in the presence of a gas constraint while also improving pumping efficiency and equipment life in the absence of a gas constraint. The controller determines target pump fill automatically, eliminating the need for user intervention—autonomous operation. Unique to this new control method is the benefit of increased production rates during gassy situations and increased pumping efficiency during non-gassy situations.

Figure 4:
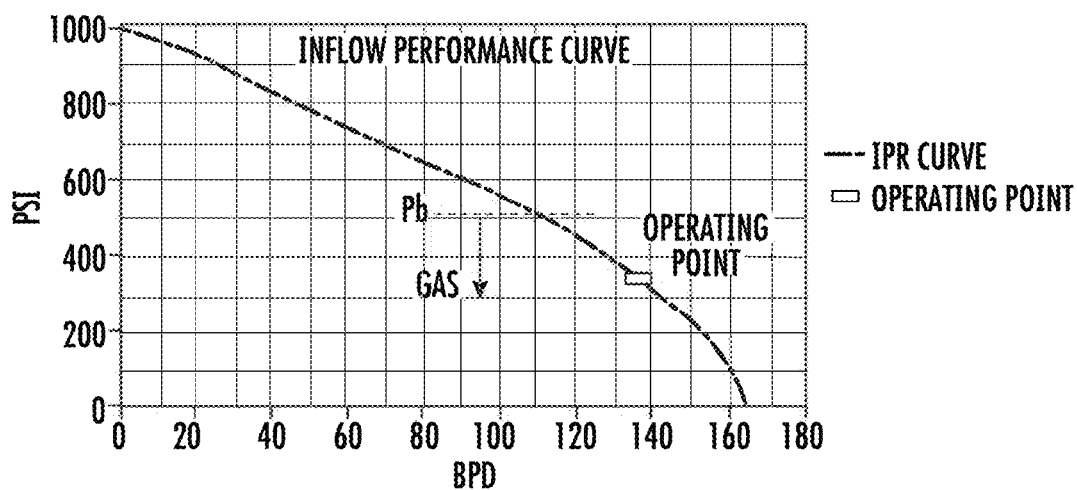
FIG. 4 is a graphical representation showing an exemplary IPR curve simulation such as would be generated by a conventional rod pump control system.

FIG. 4 shows an exemplary IPR curve simulation for a conventional well pump system used in a vertical well 28, such as that shown in FIG. 1, where the rod pump system uses the conventional rod pump control system 21. FIG. 4 is a graphical representation of a Vogel reservoir Inflow Performance Relationship (IPR). The Target Pump Fill is fixed at 85% (e.g., 81% liquid pump fill, 4% gas fill). The FOP level is 700 feet. The system is controlled to operate at 7 strokes per minute resulting in an operating point for the system producing 138 barrels per day at a bottom-hole pressure of approximately 340 psi.

The "liquid pump fill" referenced above is the volume of liquid within the pump, at pump discharge pressure, expressed as a percentage of the total pump displacement, measured during the downstroke. It represents the net liquid pumping capacity. The "gas fill" referenced above is the volume of gas within the pump, at pump discharge pressure, expressed as a percentage of the total pump displacement, measured during the downstroke.

Figure 5:
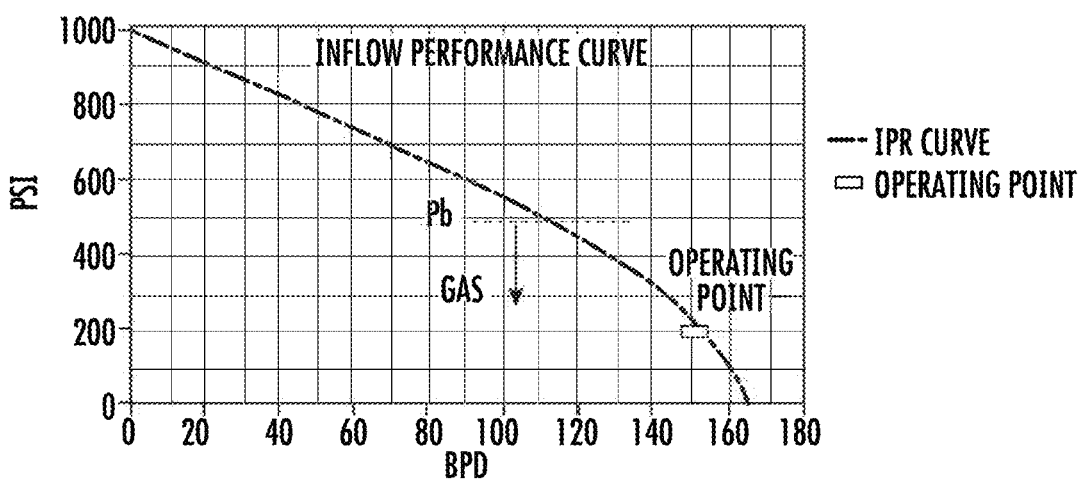
FIG. 5 is a graphical representation showing an exemplary IPR curve simulation such as would be generated by a rod pump control system constructed in accordance with an embodiment of the invention.

Contrast this to FIG. 5, which is a graphical representation of an IPR curve simulation for a well pump system in which the controller 121 of the present invention is configured with an Auto Target Pump Fill mode that is enabled, and in which the Target Pump Fill setting is automatically optimized by the controller 121. The Target Pump Fill drops from 85 to approximately 71% (e.g., 64% liquid pump fill, 7% gas fill), resulting in reduced bottom-hole pressure and a flow rate increase of about 9%. The FOP level is 480 feet. The system is controlled to operate at 9.8 strokes per minute resulting in an operating point for the system producing 150 barrels per day at a bottom-hole pressure of approximately 210 psi.

Note that an additional increase in production is possible, but at the expense of significantly higher stroking rates (as reflected in the steep downturn of the IPR curve) and gas interference in the pump. The controller 121 strikes a balance between production rate and equipment protection. The Auto Target Pump Fill algorithm recognized the increased production potential (given high FOP) and responded automatically, eliminating the need for external analysis or action.

Figure 6:
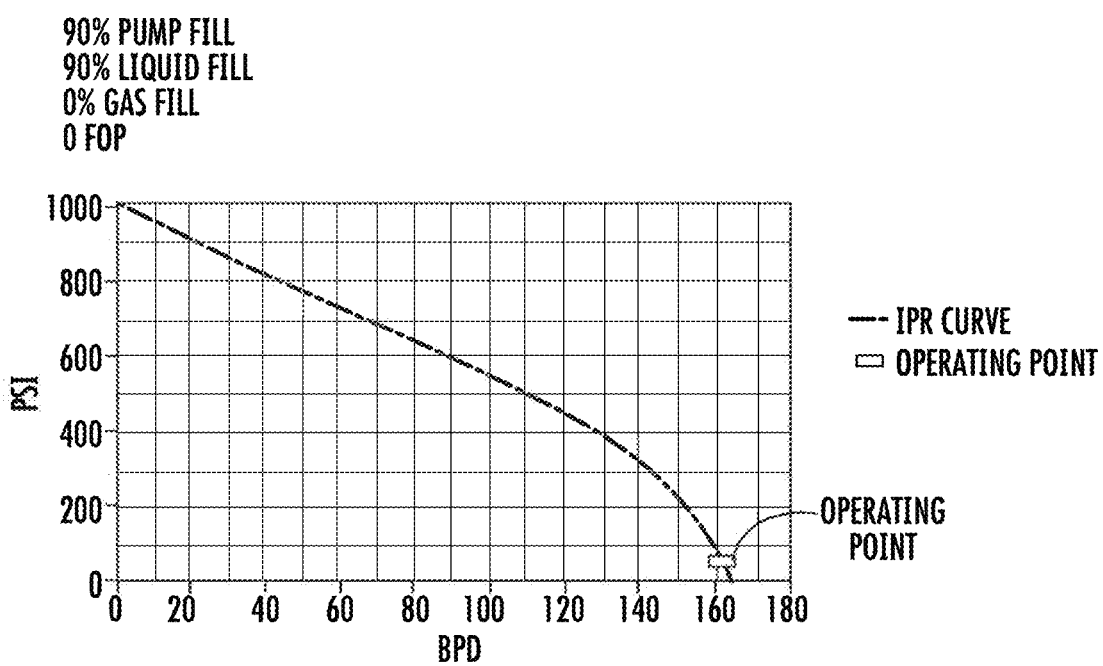
FIG. 6 is a graphical representation of showing an exemplary IPR curve simulation such as would be generated by a rod pump control system constructed in accordance with an embodiment of the invention when the well is fully pumped down.

In a further example, FIG. 6 is a graphical representation of an IPR curve simulation for a sucker well rod pumping system 120 operating at the extreme in which the controller 121 represents a vertical well that is pumped down to the pump intake ("pumped off"). That is, the FOP level is at zero. The operating point for the system represented in FIG. 6 is at 165 barrels per day at a bottom-hole pressure of approximately 50 psi. The Auto Target Pump Fill algorithm recognized the condition and increased the Target Pump Fill to 90% for maximum efficiency. In this case, unlike the previous example, a reduced Pump Fill would not result in more oil production, so a higher pump fill is more desirable for greater efficiency and reduced equipment wear.

Figure 7:
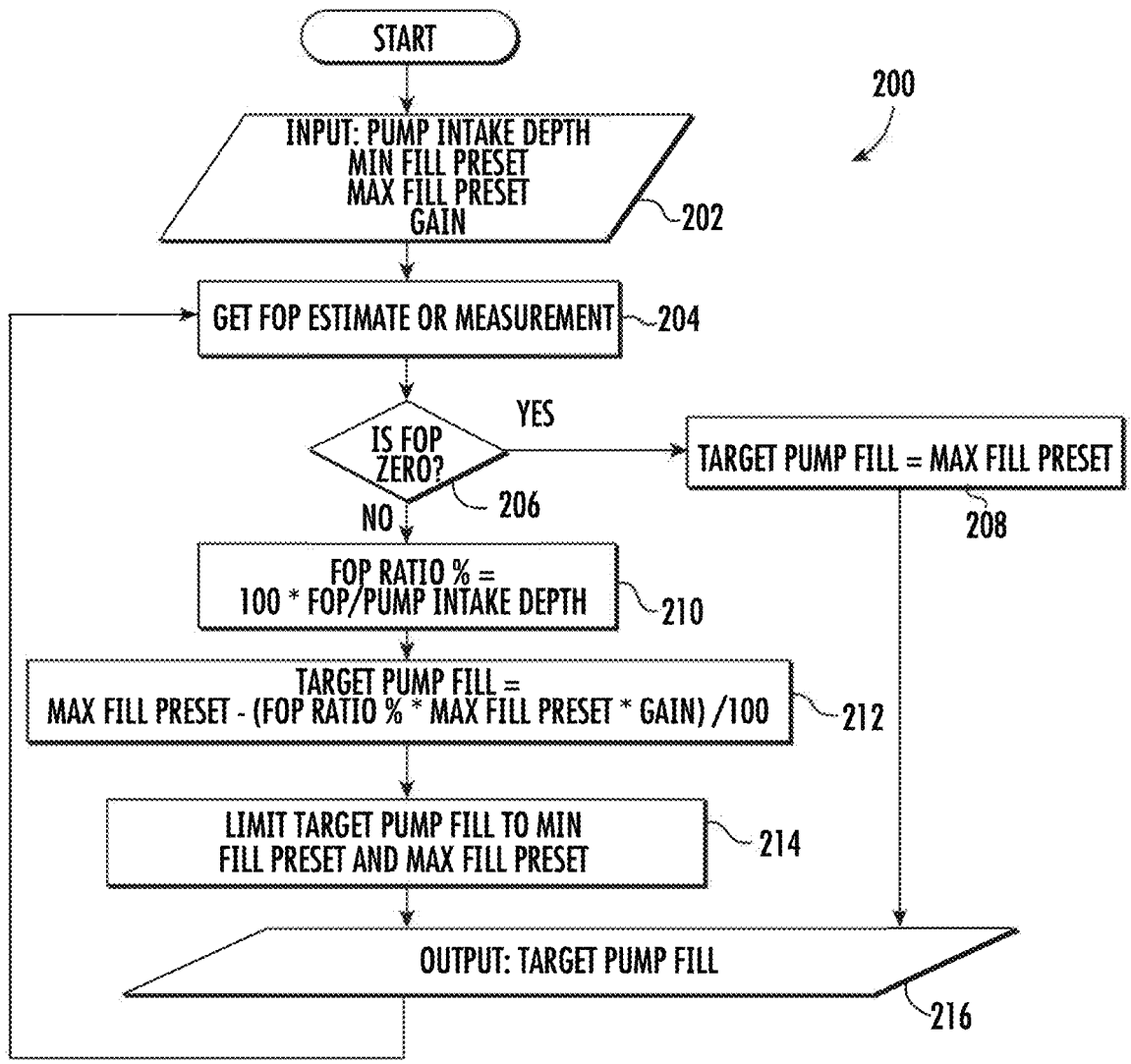
FIG. 7 is a flowchart illustrating a method for controlling a sucker rod well pumping system using an automatic pump fill algorithm, according to an embodiment of the invention.

FIG. 7 is a flowchart 200 illustrating a method for controlling a sucker rod well pumping system 120 using an automatic pump fill algorithm according to an embodiment of the invention. More specifically, flowchart 200 shows how the control system sets the target pump fill for the sucker rod well pumping system 120. In the first Step 202, a pump intake depth, minimum fill preset, maximum fill preset, and a gain value are input 202 into the controller 121 for the sucker rod well pumping system 120. The minimum fill preset is determined by certain pump characteristics, such as compression ratio, for example. The maximum fill preset is needed to provide a safeguard so that the pumping speed of the system is properly controlled.

More specifically, these parameters are input into an electronic memory of the controller 121, and which serve as a basis for the automatic control of well pumping speed by the controller 121. The "gain" value being input into the controller 121 is a measure of how aggressively the system responds to the calculated pump fill error. As the gain value increases, the calculated target pump fill decreases.

In the second Step 204, a measurement or estimate of the fluid over pump (FOP) level is obtained. The FOP level may be obtained by various means such as via downhole sensors, for example, or by other means, for example, based on calculations involving the load or motor torque on the pump motor. U.S. Pat. No. 7,668,694 entitled, "Determination and Control of Wellbore Fluid Level, Output Flow, and Desired Pump Operating Speed, Using a Control System For a Centrifugal Pump Disposed Within the Wellbore," discloses a system and method for determination of the level of fluid over the pump, the teachings and disclosure of which is incorporated in its entirety herein by reference thereto.

In Step 206, the process branches depending on the results of a determination as to whether or not the level of fluid over the pump is zero. If the level of fluid over the pump is zero, the process moves to step 208 in which the target pump fill is set to the maximum fill preset. The well pump output is aligned with the maximum fill preset as the target pump fill 216, and the process returns to Step 204 in which another measurement or estimate of the fluid over pump level 204 is obtained.

If the level of fluid over the pump is not zero, the process moves to Step 210 in which an FOP percentage ratio is calculated. As shown in FIG. 4, the FOP percentage ratio is determined by the following formula.

$$FOP \text{ Ratio}\% = 100 \times \frac{FOP}{\text{Pump Intake Depth}}$$

In the following Step 212, the Target Pump Fill is calculated as shown below.

$$\text{Target Pump Fill} = \text{Max Fill Preset} - \frac{FOP \text{ Ratio }\% \times \text{Max Fill Preset} \times \text{Gain}}{100}$$

In the following Step, 214, the Target Pump Fill calculated in Step 212 is limited so that it is not less than the Minimum Fill Preset nor more than the Maximum Fill Preset. If the calculated Target Pump Fill is within the Minimum and Maximum Fill Presets, the process moves to Step 216. In Step 216, the well pump output is aligned with the target pump fill as determined in Step 214, and the process returns to Step 204 in which another measurement or estimate of the fluid over pump level 204 is obtained. The control loop shown in FIG. 7 is executed on a regular and ongoing basis during normal operation of the system.

Figure 8:
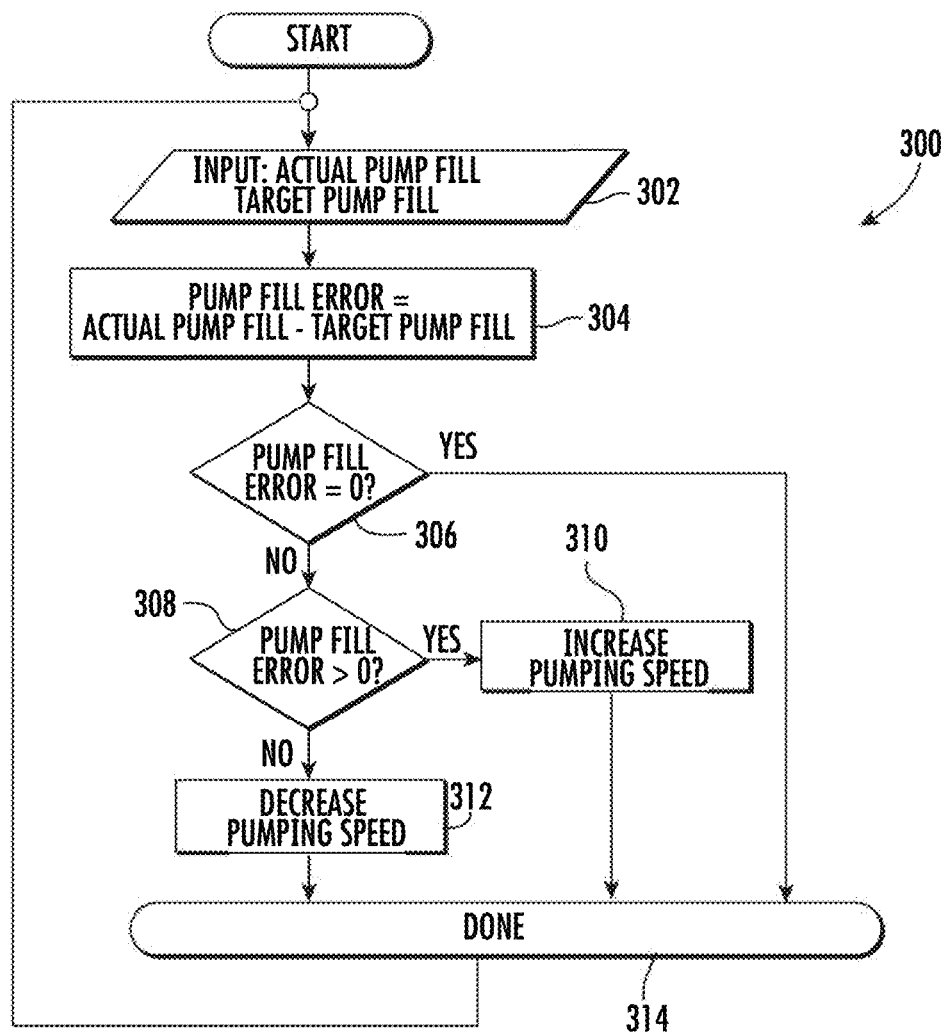
FIG. 8 is a flowchart illustrating a process for controlling the pumping speed of the sucker rod well pumping system as a function of pump fill, in accordance with an embodiment of the invention.

FIG. 8 is a flowchart 300 illustrating a process for controlling the pumping speed of the sucker rod well pumping system 120 as a function of Pump Fill, in accordance with an embodiment of the invention. In the first Step 302, an actual pump fill, and a target pump fill are input into the controller 121 for the sucker rod well pumping system 120. In the second Step 304, the Pump Fill Error is determined by calculating the difference between the actual pump fill and the target pump fill. In the third Step 306, a determination is made as to whether Pump Fill Error is zero.

If the Pump Fill Error is zero, the process terminates at Step 314, after which the process returns to Step 302 in which the actual pump fill, and the target pump fill are input into the controller 121 for the sucker rod well pumping system 120. If Pump Fill Error is not zero, the process moves to Step 308 in which a determination is made as to whether the Pump Fill Error is greater than zero. If the Pump Fill Error is greater than zero, the process moves to Step 310 in which the controller 121 controls the pump motor 132 to effect an increase in the pumping speed of the sucker rod well pumping system 120. The process then terminates at Step 314, after which the process returns to Step 302 in which the actual pump fill, and the target pump fill are input into the controller 121 for the sucker rod well pumping system 120.

If the Pump Fill Error is not greater than zero, the process moves to Step 312 in which the controller 121 controls the pump motor 132 to effect a decrease in the pumping speed of the sucker rod well pumping system 120. The process then terminates at Step 314, after which the process returns to Step 302 in which the actual pump fill, and the target pump fill are input into the controller 121 for the sucker rod well pumping system 120.

In certain instances, there is an optimal target pump fill. If the Target Pump Fill is above the optimal value, the production rate or number of barrels per day (BPD) will drop and the pump intake pressure (Pip) will increase. If the Target Pump Fill is below this optimal value, then the unit will run faster with lower pump fill, but with no more BPD and the same Pip. This optimal Target Pump Fill is a function of the bubble point pressure and the gas separation efficiency. That is, the gas/liquid fraction in the pump is governed by the bubble point and gas separator efficiency. If the Target Pump Fill is too high, then that gas/liquid fraction will not be sustained. Target fill must be low enough for the pump to sustain that gas/liquid ratio. Furthermore, pump efficiency drops with pump fill because of increased gas.

Embodiments of the invention described herein provide a new control process that solves the control aspect of the problem of how to efficiently pump fluids from horizontal wells by automatically selecting the controller target pump fill set point based upon average estimated fluid level over the pump. The process disclosed herein increases the production potential in the presence of a gas constraint while also improving pumping efficiency and equipment life in the absence of a gas constraint. As stated above, this new control process has the benefit of increased well production rate for gassy wells, and increased well pumping efficiency for non-gassy wells.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for controlling a well pumping system, the method comprising the steps of:
   entering a pump intake depth, a minimum fill preset, a maximum fill preset, and a gain value into a controller for the well pumping system;
   determining a fluid over pump level;
   wherein if the fluid over pump level is zero:
      setting a target pump fill equal to the maximum fill preset; and
   wherein if the fluid over pump level is not zero:
      calculating a fluid over pump ratio using the pump intake depth; and
      calculating the target pump fill using the fluid over pump ratio and the gain value;
   calculating a pump fill error as the difference between the target pump fill and an actual pump fill; and
   controlling a pumping speed of the well pumping system based on the pump fill error.

2. The method of claim 1, wherein calculating the pump fill error comprises setting the pump fill error equal to the actual pump fill minus the target pump fill.

3. The method of claim 1, wherein controlling a pumping speed of the well pumping system based on the pump fill error comprises:
   increasing the pumping speed if the pump fill error is greater than zero;
   decreasing the pumping speed if the pump fill error is less than zero; and
   maintaining the pumping speed if the pump fill error is equal to zero.

4. The method of claim 1, wherein calculating a fluid over pump ratio comprises calculating a fluid over pump ratio using the following formula:

$$FOP \text{ Ratio}\% = 100 \times \frac{FOP}{\text{Pump Intake Depth}}.$$

5. The method of claim 1, wherein the target pump fill is calculated using the following formula:

$$\text{Target Pump Fill} = \text{Max Fill Preset} - \frac{FOP \text{ Ratio}\% \times \text{Max Fill Preset} \times \text{Gain}}{100}.$$

6. The method of claim 1, wherein calculating the target pump fill using the fluid over pump ratio and the gain value comprises limiting the target pump fill to a value no greater than the maximum fill preset and no lower than the minimum fill preset.

* * * * *